United States Patent Office 3,004,886
Patented Oct. 17, 1961

3,004,886
DERIVATIVES OF ALKALI METAL DIHYDRO-CARBYLOXYPHOSPHINYL THIOFORMATES
Daniel W. Grisley, Jr., Dayton, Ohio, and Samuel Allen Heininger, Warson Woods, Mo., assignors to Monsanto Chemical Company, St. Louis, Mo., a corporation of Delaware
No Drawing. Filed Aug. 10, 1959, Ser. No. 832,426
27 Claims. (Cl. 167—22)

This invention relates to organic phosphorus compounds containing sulfur. In one respect, this invention relates to S-substituted dihydrocarbyloxyphosphinyl thioformates as new compounds, more specifically the S-acyl-, S-sulfenyl-, and S-alkenyl-dihydrocarbyloxyphosphinyl thioformates. In another respect, this invention relates to methods for preparing the S-acyl-, S-sulfenyl-, and S-alkenyl-dihydrocarbyloxyphosphinyl thioformates from the alkali metal dihydrocarbyloxyphosphinyl thioformates. In another respect, this invention relates to biological toxicant compositions containing at least one of the S-acyl-, S-sulfenyl-, and S-alkenyl-dihydrocarbyloxyphosphinyl thioformates as the essential active ingredient. In another respect, this invention relates to methods for controlling biological pests by the application of biological toxicant composition containing one of the S-acyl-, S-sulfenyl-, and S-alkenyl-dihydrocarbyloxyphosphinyl thioformates.

Numerous organic compounds containing both sulfur and phosphorus atoms are known to exist and to have a considerable commercial value in a great variety of useful applications. For example, the alkali metal dihydrocarbyloxyphosphinyl thioformates have been found to be useful in preparing biological toxicant compositions. These thioformates and their method of preparation from the alkali metal hydrogen phosphite diesters by reaction with carbonyl sulfide are disclosed and claimed in the copending application Serial No. 832,424, of Grisley, Heininger, and Birum, filed on August 10, 1959.

We have discovered that new organic phosphorus compounds containing sulfur are formed when acyl halides, sulfenyl halides and alkenyl halides are reacted with the alkali metal dihydrocarbyloxyphosphinyl thioformates.

An object of this invention is to provide new dihydrocarbyloxyphosphinyl thioformates wherein an organic radical is substituted on the sulfur atom of the thioformate group.

Another object of this invention is to provide S-acyl-, S-sulfenyl-, and S-alkenyl-dihydrocarbyloxyphosphinyl thioformates as new compounds.

Another object of this invention is to provide methods for reacting alkali metal dihydrocarbyloxyphosphinyl thioformates with sulfenyl, acyl and alkenyl halides.

Another object of this invention is to provide biological toxicant compositions containing at least one of the S-sulfenyl-, S-acyl-, or S-alkenyl-dihydrocarbyloxyphosphinyl thioformates as an essential active ingredient.

Another object of this invention is to provide methods for controlling biological pests by the application of a biological toxicant composition containing one of the S-sulfenyl-, S-acyl-, or S-alkenyl-dihydrocarbyloxyphosphinyl thioformates.

Other aspects, objects and advantages of the invention are apparent from a consideration of the accompanying disclosure and the appended claims.

According to the present invention, alkali metal dihydrocarbyloxyphosphinyl thioformates are reacted with an organic halide selected from the group consisting of sulfenyl, acyl and alkenyl halides to form, as new compounds, the S-sulfenyl-, S-acyl-, and S-alkenyl-dihydrocarbyloxyphosphinyl thioformates, according to the reaction which proceeds substantially as follows:

wherein R' is a hydrocarbyl radical containing from 1 to 12 carbon atoms and selected from the group consisting of alkyl, aryl, alkaryl and aralkyl radicals, M is an alkali metal selected from the group consisting of sodium, potassium and lithium, X is a halogen selected from the group consisting of chlorine and bromine, and Z is an organic radical selected from the group consisting of sulfenyl, acyl, and alkenyl radicals. Where Z is a sulfenyl radical, the organic halide is represented by the structural formula R''—S—X wherein R'' is selected from the group consisting of alkyl, haloalkyl, aryl, haloaryl, nitroaryl, halonitroaryl, alkaryl, alkylhaloaryl, alkylnitroaryl, arylalkyl, haloarylalkyl, and nitroarylalkyl radicals containing from 1 to 12 carbon atoms and X is as above defined. Where Z is an acyl radical, the organic halide is represented by the formula $$R''-\overset{O}{\underset{\|}{C}}-X$$

wherein R'' and X are as above defined. Where Z is an alkenyl radical, the organic halide is represented by the structural formula R'''-X wherein R''' is a radical selected from the group consisting of alkenyl and haloalkenyl radicals containing from 2 to 12 carbon atoms and X is as above defined. The expression "hydrocarbyl" as used herein and in the appended claims refers to the radical obtained by the removal of a hydrogen atom from any hydrocarbon.

Further, according to the present invention, there are provided, as new compounds, S-acyl-, S-sulfenyl-, and S-alkenyl-dihydrocarbyloxyphosphinyl thioformates of the formula

wherein Z is an organic radical selected from the group consisting of acyl, sulfenyl, and alkenyl radicals. Where Z is a sulfenyl radical, the S-sulfenyl-dihydrocarbyloxyphosphinyl thioformates are represented by the formula

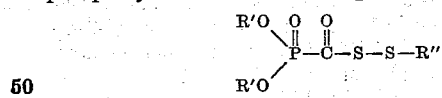

where R' and R'' are as above defined. Where Z is an acyl radical, the S-acyl-dihydrocarbyloxyphosphinyl thioformates are represented by the formula

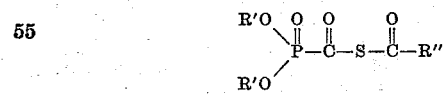

wherein R' and R'' are as above defined. Where Z is an alkenyl radical, the S-alkenyl-dihydrocarbyloxyphosphinyl thioformates are represented by the formula

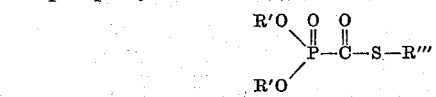

wherein R' and R''' are as above defined.

Further, according to the present invention, there are provided biological toxicant compositions comprising a carrier adjuvant and, as an essential active ingredient, a toxic amount of at least one of the above defined S-acyl-, S-sulfenyl-, or S-alkenyl-dihydrocarbyloxyphosphinyl thioformates.

Further, according to the present invention, there are provided methods for controlling biological pests by the application of said above defined biological toxicant compositions.

The alkali metal dihydrocarbyloxyphosphinyl thioformates employed in the reaction of this invention can be any sodium, potassium or lithium salts of the dihydrocarbyloxyphosphinyl thioformic acids wherein said hydrocarbyl radicals are substantially free of acetylenic unsaturation and contain from 1 to 12 carbon atoms. Suitable hydrocarbyl radicals include the alkyl, aryl, alkaryl, and aralkyl radicals. The preparation of these alkali metal dihydrocarbyloxyphosphinyl thioformate reactants is disclosed in the above-identified application of Grisley, Heininger and Birum. Preferably, these reactants are prepared by reacting alkali metal salts of hydrocarbylphosphite diesters with carbonyl sulfide; however, this invention is not limited by the method by which the alkali metal dihydrocarbyloxyphosphinyl thioformates are prepared.

Illustrative examples of the alkali metal dihydrocarbyloxyphosphinyl thioformates used as reactants in the present invention are as follows: sodium, potassium or lithium diethoxyphosphinyl thioformate; sodium, potassium or lithium dimethoxyphosphinyl thioformate; sodium, potassium or lithium dioctoxyphosphinyl thioformate; sodium, potassium or lithium dibutoxyphosphinyl thioformate; sodium, potassium or lithium diphenoxyphosphinyl thioformate; and sodium, potassium or lithium dibenzyloxyphosphinyl thioformate.

The organic halide reactants employed in the reaction of this invention can be any of the sulfenyl, acyl or alkenyl halides, preferably the chloride or the bromides. These sulfenyl halides and acyl halides have structural formula R"—S—X and

respectively, wherein R" can be any alkyl, aryl, alkaryl, or arylalkyl radical, including halo- and nitro-substituted radicals, containing from 1 to 12 carbon atoms. The alkenyl halides, represented by the formula R'''—X can contain any alkenyl radical having from 2 to 12 carbon atoms and including the halogenated alkenyl radicals, particularly the polyhalogenated radicals.

Illustrative examples of sulfenyl halides include the following: p-toluenesulfenyl chlorides and bromides, 2,4-diethylbenzenesulfenyl chlorides and bromides, o-n-butylbenzenesulfenyl chlorides and bromides, p-t-butylbenzenesulfenyl chlorides and bromides, 2-chloro-5-methylbenzenesulfenyl chlorides and bromides, 4-methyl-2-nitrobenzene chlorides and bromides, o-, m-, and p-chloro benzenesulfenyl chlorides and bromides, 2,3-, 3,4-, 2,5-, and 2,4-dibromobenzenesulfenyl chlorides and bromides, 2,4,6-trichlorobenzenesulfenyl chlorides and bromides, pentachlorobenzenesulfenyl chlorides and bromides, 2-chloro-3-bromobenzenesulfenyl chlorides and bromides, 1-chloro-2-naphthylenesulfenyl chlorides and bromides, 2-, 3-, and 4-nitrobenzenesulfenyl chlorides and bromides, 2,4-dinitrobenzenesulfenyl chlorides and bromides, 4-chloro-2-nitrobenzenesulfenyl chlorides and bromides, 1-butanesulfenyl chlorides and bromides, chloromethanesulfenyl chlorides and bromides, trichloromethanesulfenyl chlorides and bromides, 2-chloroethanesulfenyl chlorides and bromides, 2-nitropropanesulfenyl chlorides and bromides, 5-chloropentanesulfenyl chlorides and bromides, trimethylmethanesulfenyl chlorides and bromides, benzenesulfenyl chlorides and bromides, and 2-naphthylenesulfenyl chlorides and bromides.

Illustrative examples of suitable acyl halides include the following: benzoyl chlorides and bromides, p-chlorobenzoyl chlorides and bromides, p-bromobenzoyl chlorides and bromides, 2,4-dichlorobenzoyl chlorides and bromides, 2,4-dibromobenzoyl chlorides and bromides, 3,5-dichlorobenzoyl chlorides and bromides, m-bromobenzoyl chlorides and bromides, m-chlorobenzoyl chlorides and bromides, 2-nitrobenzoyl chlorides and bromides, 3,5-dinitrobenzoyl chlorides and bromides, 2,4-dinitrobenzoyl chlorides and bromides, 2-nitro-5-methylbenzoyl chlorides and bromides, 3-nitro-5-ethylbenzoyl chlorides and bromides, 2-chloro-4-toluyl chlorides and bromides, acetyl chlorides and bromides, methacrylyl chlorides and bromides, propionyl chlorides and bromides, trimethylacetyl chlorides and bromides, isobutyryl chlorides and bromides, trichloroacetyl chlorides and bromides, and phenylacetyl chlorides and bromides.

Illustrative example of the alkenyl halides include the following: 1,1-dibromo-1-butene, 1,1-dichloro-1-butene, 1,2-dibromo-1-butene, 1,2-dichloro-1-butene, 2,3-dibromo-1-butene, 2,3-dichloro-1-butene, 2,4-dibromo-1-butene, 2,4-dichloro-1-butene, 3,4-dibromo-1-butene, 3,4-dichloro-1-butene, 1,3-dibromo-2-butene, 1,3-dichloro-2-butene, 1,4-dichloro-2-butene, 1,1-dibromoethene, 1,1-dichloroethene, 1,1-dibromopropene, 1,1-dichloropropene, 1,2-dibromopropene, 1,2-dichloropropene, 2,3-dibromopropene, 2,3-dichloropropene, 3,3-dibromopropene, and 3,3-dichloropropene.

The reaction of the alkali metal dihydrocarbyloxyphosphinyl thioformates with the organic halides is very exothermic so that this reaction is normally conducted in an inert solvent medium under carefully controlled temperature conditions. In general, a temperature within the range of from −10 to 100° C. is used and preferably the temperature is maintained within the range of from 0 to 50° C. The use of temperatures in the upper portion of this broad temperature range normally requires the use of elevated pressure to reduce decomposition of the alkali metal dihydrocarbyloxyphosphinyl thioformate reactant. However, elevated pressures are not ordinarily required in conducting the reaction of this invention and the reaction can be carried out at subatmospheric as well as superatmospheric pressures. The solvent used should be one in which the alkali metal dihydrocarbyloxyphosphinyl thioformate is soluble, such as dioxane, diethyl Carbitol and tetrahydrofuran; however, other solvents such as benzene, toluene, hexane, diethyl ether and the like can also be used.

The reaction of this invention is normally conducted by either dissolving or suspending the alkali metal dihydrocarbyloxyphosphinyl thioformate in a suitable solvent and adding the organic halide slowly under constant agitation and carefully controlled temperature conditions involving removing the exothermic heat of reaction. The completion of the reaction can be readily determined by observing the temperature of the reaction mixture since the reaction is complete when there is no further increase in temperature due to the exothermic heat of reaction.

Illustrative examples of the S-sulfenyl-dihydrocarbyloxyphosphinyl thioformates obtained as product using sulfenyl halide reactants are as follows: S-methylthiodiethoxyphosphinyl thioformate, S-ethylthiodiethoxyphosphinyl thioformate, S-butylthiodibutoxyphosphinyl thioformate, S-methylthiodiphenoxyphosphinyl thioformate, S-trichloromethylthiodiethoxyphosphinyl thioformate, S-dibromomethylthiodimethoxyphosphinyl thioformate, S-(2-chloroethylthio)dibutoxyphosphinyl thioformate, S - phenylthiodiethoxyphosphinyl thioformate, S-(4-chlorophenylthio)diethoxyphosphinyl thioformate, S-(2,4-dibromophenylthio)diethoxyphosphinyl thioformate, S-(2-chloro-5-methylphenylthio)dimethoxyphosphinyl thioformate, S-(2,4,6 - trichlorophenylthio)dibutoxyphosphinyl thioformate, S-(2 - nitrophenylthio)diethoxyphosphinyl thioformate and S-(4-chloro-2-nitrophenylthio)diethoxyphosphinyl thioformate.

Examples of the S-acyl-dihydrocarbyloxyphosphinyl thioformates obtained as products using the acyl halide reactants are as follows: S-benzoyldiethoxyphosphinyl thioformate, S-(4-chlorobenzoyl)diethoxyphosphinyl thioformate, S - (2,4 - dichlorobenzoyl)diethoxyphosphinyl thioformate, S - (2,4 - dibromobenzoyl)diphenoxyphosphinyl thioformate, S-(2-nitrobenzoyl)dibutoxyphosphinyl thioformate, S - (3,5 - dinitrobenzoyl)diethoxyphosphinyl thioformate, S - (2,4 - dichloro - 3,5 - dinitrobenzoyl)diethoxyphosphinyl thioformate, S-(2-nitro-5-methylbenzoyl)diethoxyphosphinyl thioformate, S - acetyldiethoxyphosphinyl thioformate and S-trimethylacetyldibutoxyphosphinyl thioformate.

Illustrative examples of the S-alkenyl-dihydrocarbyloxyphosphinyl thioformates obtained as products of the reaction using alkenyl halide reactants are as follows: S-propenyldiethoxyphosphinyl thioformate, S-(2-chloropropenyl)diethoxyphosphinyl thioformate, S-(2-chloropropenyl)diphenoxyphosphinyl thioformate, S-(1-bromopropenyl)diethoxyphosphinyl thioformate, S-(3-bromopropenyl)dibutoxyphosphinyl thioformate, S-butenyldiethoxyphosphinyl thioformate, S-(1-chlorobutenyl)diethoxyphosphinyl thioformate, S-(2-chlorobutenyl)diethoxyphosphinyl thioformate, S-(3-bromobutenyl)dimethoxyphosphinyl thioformate, S-4-chlorobutenyl)diphenoxyphosphinyl thioformate, S - hexenyldiethoxyphosphinyl thioformate, and S-(2-chlorohexenyl)diethoxyphosphinyl thioformate.

The S-sulfenyl-, S-acyl-, and S-alkenyl-dihydrocarbyloxyphosphinyl thioformate products of this invention differ somewhat in physical properties from each other. In general, the S-alkenyl and S-acyl derivatives are dark-colored oils or heavy liquids of low volatility. In comparison, the saturated S-sulfenyl derivatives are generally dark-colored viscous oils of relatively low volatility whereas the unsaturated S-sulfenyl derivatives are generally light-colored, gummy solid materials. In general, all of these compounds show biological activity to varying extents and for various purposes. In addition, these compounds can also be advantageously employed as plasticizers for many plastics and resins, as lubricants and lubricant additives, and as corrosion inhibitors and the like.

The advantages, desirability and usefulness of the new compounds of this invention are illustrated by the following examples:

Example 1

S-(2 - chloropropenyl)diethoxyphosphinyl thioformate was prepared in this example by the reaction of sodium diethoxyphosphinyl thioformate with 2,3-dichloropropene. The sodium diethoxyphosphinyl thioformate in an amount of 44 g. (0.2 moles) was dissolved in tetrahydrofuran solvent and 22.2 g. of 2,3-dichloropropene (0.2 mole) added dropwise under anhydrous conditions. After approximately one-half of the 2,3-dichloropropene had been added to the solvent mixture, the mixture was heated to a temperature of 35° C. and maintained at a temperature in the range of 35 to 40° C. by control of the rate of addition of the remainder of the 2,3-dichloropropene. Upon completion of the addition of the 2,3-dichloropropene, the mixture was stirred for an additional 2 hours and the temperature maintained within the range of 35–40° C. Thereafter, the solvent was evaporated from the reaction mixture under a pressure of 20 mm. Upon the addition of 400 ml. of water to the evaporated reaction mixture, a heavy, orange-colored oil separated out and was recovered. This heavy oil dissolved in diethyl ether, dried over sodium sulfate, filtered and evaporated under a pressure of 200 mm. to yield a brown oil in an amount of 12.4 g. Infrared analysis of this oil produced a spectrum which had a peak at 5.75 microns, corresponding to the carbonyl group, and another peak at 6.5 microns, corresponding to the vinyl group. The analysis of the S-(2-chloropropenyl)diethoxyphosphinyl thioformate was as follows:

| | Found | Calculated for $C_8H_{14}ClO_4PS$ |
|---|---|---|
| Percent Carbon | 35.71 | 35.23 |
| Percent Hydrogen | 5.28 | 5.17 |

Example 2

In this example, S - trichloromethylthiodiethoxyphosphinyl thioformate was produced by reaction of sodium diethoxyphosphinyl thioformate with trichloromethylsulfenyl chloride. A tetrahydrofuran solution of sodium diethoxyphosphinyl thioformate containing 44 g. of said thioformate (0.2 mole) was added slowly to 37.2 g. (0.2 mole) of trichloromethylsulfenyl chloride under anhydrous conditions. The reaction mixture was maintained at a temperature in the range of 25 to 30° C. with ice cooling and with agitation for a period of about 1.5 hours. Thereafter, the solvent was evaporated under 20 mm. pressure to yield a heavy oil. Two hundred ml. of water were added to this heavy oil to effect a phase separation. Sodium carbonate was then added in an amount sufficient to neutralize the aqueous phase. Then the oil was dissolved in chloroform and the organic phase separated, washed with water, dried with sodium sulfate, filtered and evaporated to yield an orange-colored oil in an amount of 26.9 g. The infrared spectrum of this oil, S-trichloromethylthiodiethoxyphosphinyl thioformate, had a peak at 5.81 microns corresponding to the carbonyl group.

Example 3

S - 3,5 - dinitrobenzoyldiethoxyphosphinyl thioformate was prepared in this example by reaction of sodium diethoxyphosphinyl thioformate with 3,5-dinitrobenzoyl chloride. A tetrahydrofuran solution containing 44 g. of sodium diethoxyphosphinyl thioformate (0.2 mole) was added dropwise to 46 g. (0.2 mole) of 3,5-dinitrobenzoyl chloride dissolved in 50 ml. of tetrahydrofuran under anhydrous conditions. The initial temperature of the reaction mixture was 10° C. but after 10 minutes a white solid precipitated and the temperature of the mixture rose to 22° C. over a period of 20 minutes with the formation of a purple-colored solution. After stirring the reaction mixture for 15 minutes, the solvent was evaporated at 20 mm. pressure to yield a red semi-solid material. Upon the addition of 300 ml. of diethyl ether, a tan solid was separated. This solid material was recovered by filtration and identified by infrared analysis as 3,5-dinitrobenzoic acid. The filtrate separated from this solid material was evaporated at room temperature under 20 mm. pressure to yield a dark oil in an amount of 40.4 g. The infrared spectrum of this oil, S-3,5-dinitrobenzoyldiethoxyphosphinyl thioformate, had a peak at 5.80 microns corresponding to the carbonyl group. The carbon analysis and hydrogen analysis of this compound were found to be 35.84% and 4.98% respectively, which compare favorably with the calculated values of 36.73% and 3.34%.

Example 4

In this example, S-(4-chlorophenyl)thiodiethoxyphosphinyl thioformate was prepared by reaction of sodium diethoxyphosphinyl thioformate with p-chlorobenzenesulfenyl chloride. A tetrahydrofuran solution containing 44 g. of sodium diethoxyphosphinyl thioformate (0.2 mole) was added under a dry atmosphere to 0.2 mole of p-chlorobenzenesulfenyl chloride. The temperature of the mixture was maintained at 40° C. with ice cooling and after the addition of the tetrahydrofuran solution, the mixture was stirred for an additional 30 minutes at room temperature. Water in amount of 200 ml. and chloroform in an amount of 100 ml. were added to the reaction mixture which was then shaken thoroughly. The organic phase obtained was washed with sodium bicarbonate until the aqueous phase remained alkaline. The organic phase was then separated, dried over sodium sulfate, filtered and evaporated at 20 mm. pressure to yield a yellow semi-solid amounting to 40 g. This semi-solid, S-(4-chlorophenyl)thiodiethoxyphosphinyl thioformate, gave a chemical analysis as follows:

|  | Found | Calculated for $C_{11}H_{14}ClO_4PS_2$ |
|---|---|---|
| Percent Carbon | 37.39 | 38.76 |
| Percent Hydrogen | 3.84 | 4.14 |
| Percent Phosphorus | 8.83 | 9.09 |

*Example 5*

In this example, S-(2-chloropropenyl) diethoxyphosphinyl thioformate and S-3,5-dinitrobenzoyldiethoxyphosphinyl thioformate were evaluated as soil fungicides against soil-borne pathogens. One pound of soil infested with damping-off fungi Phymatotrichum sp., *Rhizoctonia solani, Sclerotium rolfsii, Fusarium lycopersici, Verticillium albo-atrum*, and Pythium sp. was placed in a Mason jar and a 5 ml. portion of a 1% acetone solution of the candidate chemical added to give an application rate of 100 p.p.m. The jar was then sealed and the contents thoroughly mixed by vigorous shaking. The treated soil was incubated at room temperature for 24 hours and then transferred to 4-inch clay pots within which were planted 5 seeds of each beans, cotton, cucumber and pea. The seeded pots were incubated at 70° F. and 98% relative humidity for 24 hours. The pots were then transferred to a greenhouse where disease assessments were made 10 to 14 days later. At the end of this time, it was found that 18 to 20 out of a possible 20 plants were growing in the pot which had been treated with S-3,5-dinitrobenzoyldiethoxyphosphinyl thioformate. In the pot treated with S-(2-chloropropenyl)diethoxyphosphinyl thioformate, 15 to 17 healthy plants out of a possible 20 plants had developed.

*Example 6*

In this example, S-3,5-dinitrobenzoyldiethoxyphosphinyl thioformate was tested as a pre-emergent herbicide. Soil which had been screened through a ½-inch screen mesh and mixed with sand in a proportion of 2 parts of soil to 1 part of sand was placed in aluminum pans of a dimension 13" x 9" x 2" and compacted to a depth of ⅜ inch from the top of the pan. Five seeds of each of tomato, morning glory, radish-mustard, and sorghum; ten seeds of sugar beet; 20 seeds of wild buckwheat, wild oats, crabgrass, rye grass and barnyard grass; and from 20 to 30 seeds of pigweed were then placed on top of the packed soil in an arrangement whereby ⅓ of the area of the soil surface at one end of the pan was scattered randomly with the broad-leaf plants and another ⅓ of the area of the soil surface at the other end of the pan was scattered with the narrow-leaf plants. In the ⅓ area of the soil surface between the two portions containing seeds, ten brome-cheat grass seeds were placed in a row. The seeds were then covered with soil to the top of the pan and the surface of the soil sprayed with 30 cc. of an aqueous solution of a liquid fertilizer.

The herbicidal solution was prepared by dissolving 0.5 g. of S-3,5-dinitrobenzoyldiethoxyphosphinyl thioformate in 25 cc. of acetone to form a stock solution. Ten cc. of this stock solution was then diluted with water to 30 cc. and this solution was sprayed over the entire area of the pre-planted pan to correspond to an application rate of 25 lbs./acre.

Another pan containing the above seeds was prepared in the same manner as described above except that the test chemical was not added to the soil and the soil was treated with only the liquid fertilizer solution. This pan constituted a blank for assessment of the herbicidal activity of the test chemical.

The two pans containing planted seeds therein were placed in ⅛ inch of water and allowed to adsorb moisture through perforated bottoms until the soil surface was completely moist. The pans were then transferred to a wet sand bench in a greenhouse and maintained there for 14 days under ordinary conditions of sunlight and watering.

Observation of the pans at the end of that time disclosed that the crabgrass in the pan sprayed on the surface with S-3,5-dinitrobenzoyldiethoxyphosphinyl thioformate had been very severely affected since no crabgrass seedlings had emerged whereas the crabgrass seeds in the untreated pan had germinated with the formation of healthy seedlings. The effect on barnyard grass and brome-cheat grass was moderate with few seedlings developed. The effect on pigweed was slight with the development of a number of seedlings. There was no evidence of phytotoxicity with respect to the remainder of the plants since the seedlings from these seeds had emerged and were growing just as well as those in the untreated pan.

*Example 7*

In this example, the contact herbicidal activity of S-(4-chlorophenylthio)diethoxyphosphinyl thioformate was evaluated. Herbicidal solutions were prepared by dissolving the test chemical in acetone and adding sufficient water to make solutions of various concentrations for application to 21-day old plants grown in aluminum pans. The plants were sprayed to run-off and then the pans of plants placed in the greenhouse under ordinary conditions of sunlight and watering for 10 days. Observation of the plants at this time showed that all of the crabgrass plants sprayed with the 0.50% solution of the test chemical were dead whereas there had been severe injury to the bean plants, moderate injury to the grass and broad-leaf plants, and only slight injury to the rye grass and wild oats plants. At a concentration of 0.20%, there was severe inury to the bean plants, slight injury to the broadleaf plants, and no injury to the grass plants. At a concentration of 0.50%, there was slight injury to the broad-leaf plants and no injury to the grass or bean plants.

*Example 8*

S-(trichloromethylthio)diethoxyphosphinyl thioformate and S-3,5-dinitrobenzoyldiethoxyphosphinyl thioformate were evaluated as residual insecticides in a contact type test. In these tests, acetone solutions of the test chemicals of known concentration were applied to filter paper of 9 cm. diameter and the acetone allowed to evaporate. The treated papers were fastened at one edge to glass rods and arranged in a holding chamber for 24 hours. Thereafter, the papers were removed and placed on glass sheets and glass rings placed on each filter paper in such a manner as to insure that there were no openings where insects might escape under the rings. Ten red-flour beetle adults were placed on each paper within the ring and a metal washer placed on the ring to weight the glass ring down and prevent the loss of beetles. After 24 hours, the number of live beetles was determined. It was observed that all the beetles on the papers treated with 1.0% and at 0.25% solutions of the S-3,5-dinitrobenzoyldiethoxyphosphinyl thioformate solution had been killed. In like manner, all the beetles on the paper treated with 1.0% and 0.3% solutions of S-(trichloromethylthio)diethoxyphosphinyl thioformate solutions had also been killed.

*Example 9*

In this example, the systemic action of S-(4-chlorophenylthio)diethoxyphosphinyl thioformate was evaluated by permitting plants to absorb the chemical through excised stems so that a stomach poisoning activity against insects may be produced in the leaves of the plants as the result of translocation and/or metabolism.

Long cut stems of Wood's Prolific Lima beans with cotyledons and cotyledon leaves and cucumber stems with cotyledon leaves were inserted into test tubes containing various concentrations of the chemical in the form of aqueous emulsions prepared with a commercial emulsifier. The plant stems were inserted into test tubes containing the emulsions of the chemical and the test tubes were then set in a lighted incubation chamber for 72 hours to absorb the chemical. At the end of this time, the bean leaves were excised with petioles of from 2 to 3 inches in length and placed in water-filled test tubes. These assemblies were then infested with southern armyworm larvae Prodenia eridania (Cramer) and held for 48 hours at 77° F., after which time mortality observations were made. It was observed that there was a 100% kill of the southern armyworm larvae with both 0.04% and 0.002% concentrations of the S-(4-chlorophenylthio)diethoxyphosphinyl thioformate.

*Example 10*

In this example, the contact activity of S-(4-chloropropenyl)diethoxyphosphinyl thioformate, S-(trichloromethylthio)diethoxyphosphinyl thioformate, S-3,5-dinitrobenzoyldiethoxyphosphinyl thioformate, and S-(4-chlorophenylthio)diethoxyphosphinyl thioformate were evaluated in an aqueous medium against yellow fever mosquito larvae Aëdes aegypti. Solutions of the test chemicals in acetone were prepared and diluted with distilled water to form various concentrations of the test chemical. Approximately 25 fourth instar yellow fever mosquito larvae were placed in each of the test solutions and held at room temperature for a period of 24 hours, after which time mortality observations were taken. At a concentration of 0.001%, a 100% mortality was observed for each of the test chemicals of S-(trichloromethylthio)diethoxyphosphinyl thioformate, S-3,5-dinitrobenzoyldiethoxyphosphinyl thioformate and S-(4-chlorophenylthio)diethoxyphosphinyl thioformate. At a concentration of 0.0003%, a mortality of 80% was observed for S-(2-chloropropenyl)diethoxyphosphinyl thioformate. At a concentration of 0.0003%, mortalities of 80%, 50% and 90% were observed for S-(trichloromethylthio) diethoxyphosphinyl thioformate, S-3,5-dinitrobenzoyldiethoxyphosphinyl thioformate and S-(4-chlorophenylthio)diethoxyphosphinyl thioformate, respectively.

*Example 11*

In this example, the contact and residual activity of the chemicals tested in Example 10 were evaluated on potted bean plants which had been infested with 2-spotted spider mites Tetranychus telarius. The infested bean plants were sprayed with 0.1% solutions of the various test chemicals and then placed on constant water level benches and held in the greenhouse for 48 hours. The mortality observations were made with respect to the toxicity of the various chemicals to the mobile stages, the resting stages, and residual activity. The residual activity observations were made 7 days after the spraying of the infested plants.

The mortality observations for S-(2-chloropropenyl)-diethoxyphosphinyl thioformate were 100% kill for all of the mobile stages, resting stages, eggs and residual activity. The mortality observations for S-(trichloromethylthio)diethoxyphosphinyl thioformate were 50% kill for all of the mobile stages, resting stages, eggs and residual activity. The mortality observations for S-3,5-dinitrobenzoyldiethoxyphosphinyl thioformate were 90% kill for the mobile stages and 50% kill for the resting stages, eggs and residual activity. The mortality observations for the S-(4-chlorophenylthio)diethoxyphosphinyl thioformate were 90% kill for the mobile stages, resting stages and residual activity whereas an 80% mortality was observed for the eggs.

The pesticidal compositions of this invention can be either liquids or dusts containing the new compounds of this invention admixed with suitable liquid or finely divided solid adjuvant carriers. These liquid and dust compositions can also contain, in addition to the regular adjuvants, other additaments, such as fertilizers, for particular applications.

Liquid compositions containing the desired amount of these novel thioformates can be prepared by dissolving them in an organic solvent, such as dioxane, diethyl Carbitol, or tetrahydrofuran. Although these thioformate toxicants are substantially insoluble in water, liquid compositions can be made by dispersing a finely divided thioformate in water using a suitable dispersing agent. Also, if desired, liquid compositions can be formed by dispersing the organic liquid composition containing the dissolved thioformate in water solutions to form an emulsion with the aid of a suitable dispersing and emulsifying agent. Dispersing agents employed in these compositions are oil soluble and include nonionic emulsifiers such as the condensation products of alkylene oxide with phenols and organic acids, polyoxyethylene derivatives of sorbitan esters, complexed ether alcohols and the like. Ordinarily, the concentration of the thioformate toxicant in the liquid composition will comprise from 1 to 95% by weight of the total composition.

In dust compositions, the thioformate toxicant is dispersed in finely-divided solid materials such as talc, chalk, gypsum, fuller's earth, clay and the like. The concentration of the thioformate toxicant in the dust composition can vary over wide ranges and preferably comprises from 5 to 95% by weight of the total composition.

The pesticidal compositions of this invention are applied to the situs of the pest in the conventional manner well known to those skilled in the art. Thus, where the compositions are to be applied to the foliage of growing plants, dust and liquid compositions are applied by the use of power dusters, hand sprayers, and spray dusters. The exact dosage of toxicant to be applied depends to a substantial extent upon the nature of the pest to be controlled and their environment. Suitable dosages can be readily determined by those skilled in the art from the examples given herein.

Reasonable variation and modification of the invention as described are possible, the essence of which is that there have been provided (1) S-acyl-, S-sulfenyl-, and S-alkenyldihydrocarbyloxyphosphinyl thioformates as new compounds, (2) methods for preparing the said compounds by reaction of an organic halide with an alkali metal dihydrocarbyloxyphosphinyl thioformate, (3) biological toxicant compositions containing at least one of said compounds as the essential active ingredient, and (4) methods for controlling biological pests by the application of said biological toxicant compositions.

We claim:

1. An organic phosphorus compound of the formula

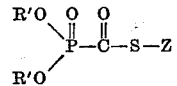

wherein R' is an hydrocarbyl radical substantially free of acetylenic unsaturation containing 1 to 12 carbon atoms selected from the group consisting of alkyl, aryl, alkaryl and aralkyl radicals and Z is an organic radical selected from the group consisting of —S—R",

and —R'" wherein R" is selected from the group consisting of alkyl, haloalkyl, aryl, haloaryl, nitroaryl, halonitroaryl, alkylaryl, alkylhaloaryl, alkylnitroaryl, arylalkyl, haloarylalkyl, and nitroarylalkyl radicals containing from 1 to 12 carbon atoms, and R'" is selected from the group consisting of alkenyl and haloalkenyl radicals containing from 2 to 12 carbon atoms.

2. An organic phosphorus compound of the formula

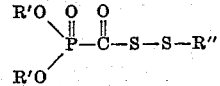

wherein R' is an hydrocarbyl radical substantially free of acetylenic unsaturation containing from 1 to 12 carbon atoms selected from the group consisting of alkyl, aryl, alkaryl and aralkyl radicals and R'' is selected from the group consisting of alkyl, haloalkyl, aryl, haloaryl, nitroaryl, halonitroaryl, alkylaryl, alkylhaloaryl, alkylnitroaryl, arylalkyl, haloarylalkyl, and nitroarylalkyl radicals containing from 1 to 12 carbon atoms.

3. An organic phosphorus compound of the formula

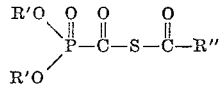

wherein R' is an hydrocarbyl radical substantially free of acetylenic unsaturation containing from 1 to 12 carbon atoms selected from the group consisting of alkyl, aryl, alkaryl, and aralkyl radicals and R'' is selected from the group consisting of alkyl, haloalkyl, aryl, haloaryl, nitroaryl, halonitroaryl, alkylaryl, alkylhaloaryl, alkylnitroaryl, arylalkyl, haloarylalkyl, and nitroarylalkyl radicals containing from 1 to 12 carbon atoms.

4. An organic phosphorus compound of the formula

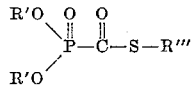

wherein R' is an hydrocarbyl radical substantially free of acetylenic unsaturation containing from 1 to 12 carbon atoms selected from the group consisting of alkyl, aryl, alkaryl, and aralkyl radicals and R''' is selected from the group consisting of alkenyl and haloalkenyl radicals containing from 2 to 12 carbon atoms.

5. S-(2-chloropropenyl)diethoxyphosphinyl) thioformate.
6. S-(trichloromethylthio)diethoxyphosphinyl thioformate.
7. S-3,5-dinitrobenzoyldiethoxyphosphinyl thioformate.
8. S-(4-chlorophenylthio)diethoxyphosphinyl thioformate.
9. A method which comprises reacting an alkali metal dihydrocarbyloxyphosphinyl thioformate, said hydrocarbyl radical being substantially free of acetylenic unsaturation and containing from 1 to 12 carbon atoms selected from the group consisting of alkyl, aryl, alkaryl, and aralkyl radicals, with an organic halide, the organic radical of said halide being selected from the group consisting of sulfenyl, acyl and alkenyl radicals having less than 12 carbon atoms and recovering as product a compound of the formula

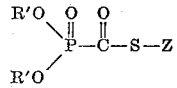

wherein R' is an hydrocarbyl radical substantially free of acetylenic unsaturation containing from 1 to 12 carbon atoms selected from the group consisting of alkyl, aryl, alkaryl and aralkyl radicals and Z is an organic radical selected from the group consisting of sulfenyl, acyl, and alkenyl radicals of less than 12 carbon atoms.

10. The method which comprises reacting an alkali metal dihydrocarbyloxyphosphinyl thioformate of the formula

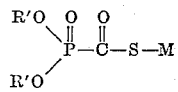

wherein R' is an hydrocarbyl radical substantially free of acetylenic unsaturation containing from 1 to 12 carbon atoms selected from the group consisting of alkyl, aryl, alkaryl and aralkyl radicals and M is an alkali metal selected from the group consisting of sodium, potassium and lithium with an organic halide selected from the group consisting of R''—S—X,

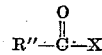

and R'''—X wherein R'' is selected from the group consisting of alkyl, haloalkyl, aryl, haloaryl, nitroaryl, halonitroaryl, alkylaryl, alkylhaloaryl, alkylnitroaryl, arylalkyl, haloarylalkyl, and nitroarylalkyl radicals containing from 1 to 12 carbon atoms, R''' is selected from the group consisting of alkenyl and haloalkenyl radicals containing from 2 to 12 carbon atoms and X is an halogen selected from the group consisting of chlorine and bromine to form an organic phosphorus compound of the formula

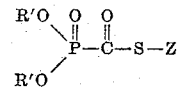

wherein R' is as above defined and Z is a radical selected from the group consisting of —S—R'',

and —R''' wherein R'' and R''' are as above defined.

11. The method which comprises reacting an alkali metal dihydrocarbyloxyphosphinyl thioformate of the formula

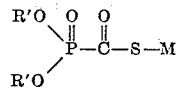

wherein R' is an hydrocarbyl radical substantially free of acetylenic unsaturation containing from 1 to 12 carbon atoms selected from the group consisting of alkyl, aryl, alkaryl and aralkyl radicals and M is an alkali metal selected from the group consisting of sodium, potassium and lithium with an organic halide of the formula R''—S—X wherein R'' is selected from the group consisting of alkyl, haloalkyl, aryl, haloaryl, nitroaryl, halonitroaryl, alkylaryl, alkylhaloaryl, alkylnitroaryl, arylalkyl, haloarylalkyl, and nitroarylalkyl radicals containing from 1 to 12 carbon atoms and X is an halogen selected from the group consisting of chlorine and bromine to form an organic phosphorous compound of the formula

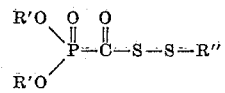

wherein R' and R'' are as above defined.

12. The method which comprises reacting an alkali metal dihydrocarbyloxyphosphinyl thioformate of the formula

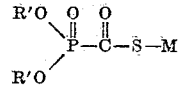

wherein R' is an hydrocarbyl radical substantially free of acetylenic unsaturation containing from 1 to 12 carbon atoms and selected from the group consisting of alkyl, aryl, alkaryl and aralkyl radicals and M is an alkali metal selected from the group consisting of sodium, potassium and lithium with an organic halide of the formula

wherein R'' is selected from the group consisting of alkyl, haloalkyl, aryl, haloaryl, nitroaryl, halonitroaryl, alkylaryl, alkylhaloaryl, alkylnitroaryl, arylalkyl, haloarylalkyl, and nitroarylalkyl radicals containing from 1 to 12 carbon atoms and X is an halogen selected from the group consisting of chlorine and bromine to form an organic phosphorus compound of the formula

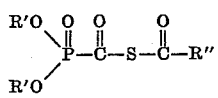

wherein R' and R'' are as above defined.

13. The method which comprises reacting an alkali metal dihydrocarbyloxyphosphinyl thioformate of the formula

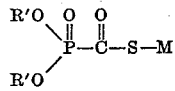

wherein R' is an hydrocarbyl radical substantially free of acetylenic unsaturation containing from 1 to 12 carbon atoms selected from the group consisting of alkyl, aryl, alkaryl and aralkyl radicals and M is an alkali metal selected from the group consisting of sodium, potassium and lithium with an organic halide of the formula R'''—X wherein R''' is selected from the group consisting of alkenyl and haloalkenyl radicals containing from 2 to 12 carbon atoms and X is an halogen selected from the group consisting of chlorine and bromine to form an organic phosphorus compound of the formula

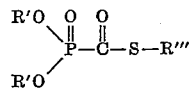

wherein R' and R''' are as above defined.

14. The method which comprises reacting trichloromethanesulfenyl chloride with sodium diethoxyphosphinyl thioformate and recovering S-(trichloromethylthio)diethoxyphosphinyl thioformate as product.

15. The method which comprises reacting 4-chlorobenzenesulfenyl chloride with sodium diethoxyphosphinyl thioformate and recovering S-(4-chlorophenylthio)diethoxyphosphinyl thioformate as product.

16. The method which comprises reacting 3,5-dinitrobenzoyl chloride with sodium diethoxyphosphinyl thioformate and recovering S-3,5-dinitrobenzoyldiethoxyphosphinyl thioformate as product.

17. The method which comprises reacting 2,3-dichloropropene with sodium diethoxyphosphinyl thioformate and recovering S-(2-chloropropenyl)diethoxyphosphinyl thioformate as product.

18. A biological toxicant comprising an inert carrier and as the essential active ingredient an organic phosphorus compound of the formula

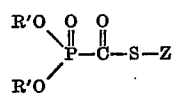

wherein R' is an hydrocarbyl radical substantially free of acetylenic unsaturation containing 1 to 12 carbon atoms selected from the group consisting of alkyl, aryl, alkaryl and aralkyl radicals and Z is an organic radical selected from the group consisting of —S—R'',

and —R''' is selected from the group consisting of alkyl, haloalkyl, aryl, haloaryl, nitroaryl, halonitroaryl, alkylaryl, alkylhaloaryl, alkylnitroaryl, arylalkyl, haloarylalkyl, and nitroarylalkyl radicals containing from 1 to 12 carbon atoms, and R''' is selected from the group consisting of alkenyl and haloalkenyl radicals containing from 2 to 12 carbon atoms.

19. The method for controlling insect pests which comprises applying to the situs of the pest a pesticidal amount of an organic phosphorus compound of the formula

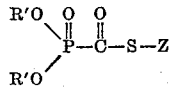

wherein R' is an hydrocarbyl radical substantially free of acetylenic unsaturation containing 1 to 12 carbon atoms selected from the group consisting of alkyl, aryl, alkaryl and aralkyl radicals and Z is an organic radical selected from the group consisting of —S—R'', $$-\overset{O}{\underset{\|}{C}}-R''$$

and —R''' is selected from the group consisting of alkyl, haloalkyl, aryl, haloaryl, nitroaryl, halonitroaryl, alkylaryl, alkylhaloaryl, alkylnitroaryl, arylalkyl, haloarylalkyl, and nitroarylalkyl radicals containing from 1 to 12 carbon atoms, and R''' is selected from the group consisting of alkenyl and haloalkenyl radicals containing from 2 to 12 carbon atoms.

20. The biological toxicant of claim 18 wherein said organic phosphorus compound is S-(2-chloropropenyl)-diethoxyphosphinyl thioformate.

21. The biological toxicant of claim 18 wherein said organic phosphorus compound is S-(trichloromethylthio)-diethoxyphosphinyl thioformate.

22. The biological toxicant of claim 18 wherein said organic phosphorus compound is S-3,5-dinitrobenzoyl-diethoxyphosphinyl thioformate.

23. The biological toxicant of claim 18 wherein said organic phosphorus compound is S-(4-chlorophenylthio)-diethoxyphosphinyl thioformate.

24. The method of controlling insect pests of claim 19 wherein said organic phosphorus compound is S-(2-chloropropenyl)diethoxyphosphinyl thioformate.

25. The method of controlling insect pests of claim 19 wherein said organic phosphorus compound is S-(trichloromethylthio)diethoxyphosphinyl thioformate.

26. The method for controlling insect pests of claim 19 wherein said organic phosphorus compound is S-3,5-dinitrobenzoyldiethoxyphosphinyl thioformate.

27. The method for controlling insect pests of claim 19 wherein said organic phosphorus compound is S-(4-chlorophenylthio)diethoxyphosphinyl thioformate.

References Cited in the file of this patent

UNITED STATES PATENTS 2,629,731     Harman _____ Feb. 24, 1953